H. B. LEHMAN.
DEVICE FOR TESTING ELECTRICAL APPARATUS.
APPLICATION FILED JUNE 6, 1910.
975,879.
Patented Nov. 15, 1910.
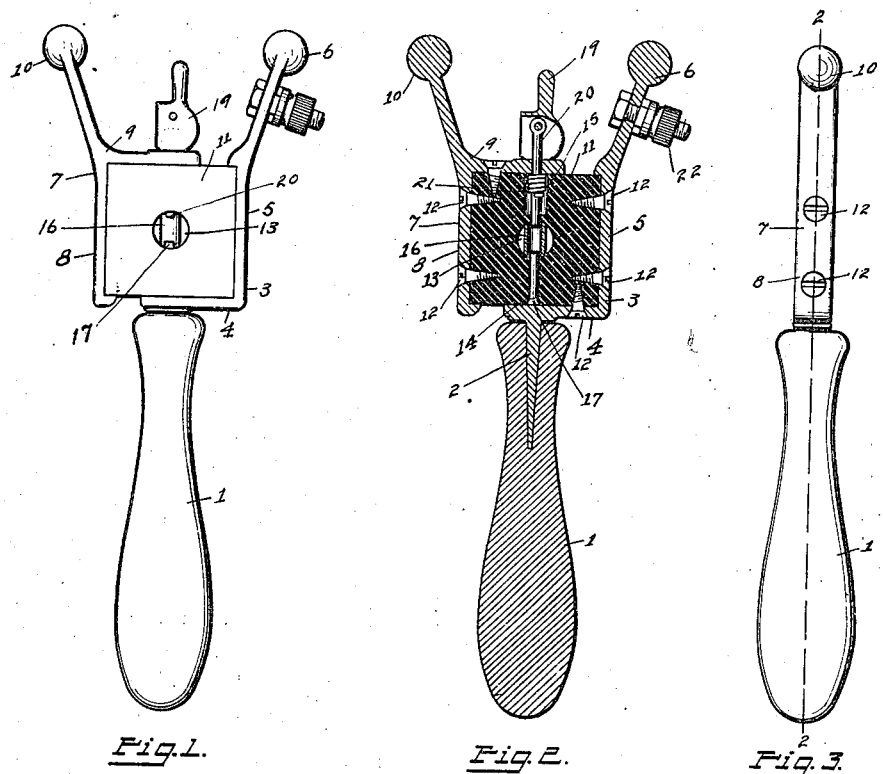
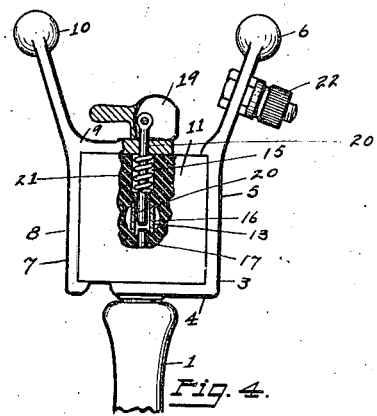
Witnesses
E. B. Maurer
A. L. Phelps
Inventor
Harry B. Lehman
By C. C. Shepherd
Attorney

UNITED STATES PATENT OFFICE.

HARRY B. LEHMAN, OF COLUMBUS, OHIO.

DEVICE FOR TESTING ELECTRICAL APPARATUS.

975,879.  Specification of Letters Patent. Patented Nov. 15, 1910.

Application filed June 6, 1910. Serial No. 565,348.

*To all whom it may concern:*

Be it known that I, HARRY B. LEHMAN, a citizen of the United States, residing at Columbus, in the county of Franklin and State of Ohio, have invented certain new and useful Improvements in Devices for Testing Electrical Apparatus, of which the following is a specification.

This invention relates to certain novel and useful improvements in a device for testing electrical apparatus.

In carrying out my invention, it is my purpose to provide a simple and efficient device or tool, which, while it may be employed in the testing of electrical apparatus of various kinds, is particularly well adapted for use in testing spark plugs, magnetos and other electrical accessories commonly forming part of the equipment of motor vehicles.

A further object of my invention is to provide means whereby a test may be made while the engine is running and without the necessity of removing the spark plug therefrom.

Further advantage incident to my invention, is that the device may also be employed for testing high tensioned wires and other electrical accessories.

My invention consists in the construction, combination and arrangement of parts set forth and falling within scope of the appended claims.

While I have herein shown and described one particular embodiment of my invention, I wish it to be understood that I do not confine myself to all the precise details of construction set forth, as a modification and variation may be made without departing from the spirit of the invention or exceeding the scope of the claims.

In the accompanying drawings: Figure 1 is a face view of a device embodying my invention, Fig. 2 is a vertical cross sectional view taken on the line 2—2 of Fig. 3, Fig. 3 is an end view, and, Fig. 4 is a detail view partly in elevation and partly in section and showing one adjustment of the movable sparking pin.

Referring now to the accompanying drawings in detail, the numeral 1 indicates a support, in the present instance the same being in the nature of a handle or grip, and is composed of any suitable non-conducting material. Secured to this support through the medium of the shank 2 is an angle arm 3 formed of suitable conducting material and comprising the horizontal portion 4 and the vertical section 5, the latter terminating in a diverging portion 6 which forms one of the pole pieces of the device. A second angle arm 7 is arranged opposite the first mentioned arm and is substantially the same construction, that is to say, comprises the vertical member 8 and the horizontal member 9, said second arm also having the pole piece 10.

Suitably secured between the angle arms is an insulated block 11, which block may be fastened by screws 12 or may be suitably clamped. This block is provided with a transverse aperture 13 arranged at approximately the center of the block and having communicating therewith the bore 14 and the socket 15. Extending through the bore 14 and into a tube of glass or other suitable material 16 at the center of the block, is a sparking pin 17, said pin being preferably arranged stationary and having its head portion in contact with the horizontal face 4 of the angle arm 3. At the opposite end of the tool is arranged a cam lever 19 having eccentrically secured thereto the spark pin 20, which latter projects through the face of the angle arm 7, the end of the pin projecting into the glass tube opposite to the pin 17, so that a gap or space is left within the tube between the terminals or points of the pins.

By reference to Figs. 2 and 4, it will be seen that within the socketed portion of the block, is arranged the extension spring 21 normally tending to draw the pin inward of the block and into the position shown in Fig. 4. When, however, it is desired to widen the gap or space between the terminals of the spark pins, the cam lever is moved into the position shown in Fig. 2, that is, with the toe thereof in contact with the flat surface of the adjacent portion of the angle arm, so that the pin is withdrawn and the spring compressed.

In order that the device may be employed in testing high tensioned wires and other electric apparatus, I provide a binding post or other suitable electric connection 22, to which the wire may be secured and the test conducted as hereinafter described.

From the above description, taken in connection with the accompanying drawings, the construction and operation of my invention will be readily apparent to those skilled in the art. Assuming that it be desired to test a spark plug, while the engine is running, one of the pole members, for instance the pole 6 is placed in contact with the plug, while the opposite member, or the pole piece 10, is placed in contact with an adjacent portion of the engine. The current then passing from the plug down through the angle arm 3, and through the pin 17, jumps the gap between the terminals of the pin and thence passing through the movable pin 20 to the opposite pole or terminal. If the plug be in proper working condition, the sparking taking place within the glass tube and between the ends of the pins, will demonstrate this fact.

In the case of testing a wire, one end of the wire may be secured to the binding post, adjacent to the pole 6 and the opposite pole piece may be placed in contact with any suitable part of the mechanism, to form the circuit, so that the sparking will be exhibited within the tool and between the terminals as heretofore described. It will be noted that I have provided an exceedingly simple yet efficient tool, through the medium of which the faulty or defective working of a piece of electrical apparatus, may be readily detected and without interfering with the normal operation of such apparatus.

What I claim, is—

1. A device of the class described comprising a suitable support, two angle arms, an insulated block interposed between said angle arms and having a transverse bore therein, and sparking pins extending into said insulated block and having their terminals spaced apart in the opening within said block.

2. The combination with suitable conducting material having pole pieces carried thereon, of insulating material held between said members and having apertures formed therein, a transparent tube within one of said apertures and sparking pins projecting into said tube and having the ends thereof spaced apart.

3. The combination with a plurality of members formed of conducting material, a block of insulating material supported between said members, said block having a suitable opening therein, a sparking pin contacting with one of said conducting members and having its terminal projecting into said opening, a second sparking pin having its end projecting into the opening whereby a gap is formed between the terminals of the two pins, and means for adjusting the second sparking pin.

4. The combination with a plurality of members having pole pieces formed thereon, of insulating material arranged between said members, a plurality of sparking pins projecting into an opening within said insulating material whereby a space or gap is formed between the terminals of the pins, and spring tension means for adjusting one of said pins to vary the gap or space between said pins.

5. The combination with a plurality of angle arms having pole pieces formed thereon, of insulating material held between said arms, said insulating material having a transverse bore therein, and openings communicating with said bore, a stationary sparking pin having its terminal extending into said bore, a movable sparking pin having its terminal extending into said bore, and means for adjusting the movable sparking pin relative to the stationary pin.

In testimony whereof I affix my signature in presence of two witnesses.

HARRY B. LEHMAN.

Witnesses:
R. B. CAVANAGH,
A. L. PHELPS.